United States Patent [19]

Bessler et al.

[11] Patent Number: 5,410,230
[45] Date of Patent: Apr. 25, 1995

[54] VARIABLE SPEED HVAC WITHOUT CONTROLLER AND RESPONSIVE TO A CONVENTIONAL THERMOSTAT

[75] Inventors: Warren F. Bessler, Schenectady, N.Y.; John M. Hooker, Fort Wayne; Rajendra K. Shah, Indianapolis, both of Ind.

[73] Assignee: General Electric Company, Fort Wayne, Ind.

[21] Appl. No.: 25,099

[22] Filed: Mar. 2, 1993

Related U.S. Application Data

[63] Continuation-in-part of Ser. No. 889,708, May 27, 1992.

[51] Int. Cl.[6] .......................... G05D 23/00; H02J 7/00
[52] U.S. Cl. ...................................... 318/471; 318/53; 34/562; 34/575
[58] Field of Search .............. 318/254, 439, 138, 471, 318/483, 432, 434, 53, 66, 68, 77; 364/493, 503; 34/523, 524, 535, 543, 562, 563, 572; 62/176, 6, 156, 157, 231; 454/222, 229, 236; 388/803, 809, 816, 730, 934

[56] References Cited

U.S. PATENT DOCUMENTS

| | | | |
|---|---|---|---|
| 3,415,071 | 12/1968 | Kompelien | 62/158 |
| 3,545,218 | 12/1970 | Greenberg | 62/157 |
| 3,695,054 | 10/1972 | Barry | 62/115 |
| 3,762,178 | 10/1973 | Yamada et al. | 62/157 |
| 3,801,888 | 4/1974 | Faulkner | 318/471 |
| 3,853,174 | 12/1974 | Kramer | 165/39 |
| 3,877,243 | 4/1975 | Kramer | 62/180 |
| 3,890,798 | 6/1975 | Fujimoto et al. | 62/155 |
| 4,015,182 | 3/1977 | Erdman | 318/334 |
| 4,075,864 | 2/1978 | Schrader | 62/180 |
| 4,167,966 | 9/1979 | Freeman | 165/2 |
| 4,250,544 | 2/1981 | Alley | 364/110 |
| 4,267,967 | 5/1981 | Beck et al. | 236/49 |
| 4,271,898 | 6/1981 | Freeman | 165/16 |
| 4,292,813 | 10/1981 | Paddock | 62/158 |
| 4,345,162 | 8/1982 | Hammer et al. | 364/493 |
| 4,346,434 | 8/1982 | Morinaga | 364/183 |
| 4,373,663 | 2/1983 | Hammer | 364/505 |
| 4,389,853 | 6/1983 | Hile | 62/89 |
| 4,390,826 | 6/1983 | Erdman et al. | 318/439 |
| 4,415,844 | 11/1983 | Mendenhall et al. | 318/254 |
| 4,423,765 | 1/1984 | Hildebrand | 165/12 |
| 4,459,519 | 7/1984 | Erdman | 318/254 |
| 4,467,617 | 8/1984 | Morgan et al. | 62/180 |
| 4,495,450 | 1/1985 | Tokizaki et al. | 318/138 |
| 4,500,821 | 2/1985 | Bitting et al. | 318/254 |
| 4,540,921 | 9/1985 | Boyd, Jr. et al. | 318/254 |
| 4,599,547 | 7/1986 | Ho | 318/594 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,653,285 | 3/1987 | Pohl | 62/126 |
| 4,667,480 | 5/1987 | Bessler | 62/180 |

(List continued on next page.)

*Primary Examiner*—Jonathan Wysocki
*Attorney, Agent, or Firm*—Ralph E. Krisher, Jr.

[57] ABSTRACT

A system for conditioning air in a space by heating or cooling the air to change its temperature. A thermostat located within the space generates a two state temperature signal having a cyclic parameter which corresponds to the temperature of the air in the space as it rises and falls. A compressor supplies refrigerant to a heat exchanger by means of which changes are made in the temperature of the air. A variable speed motor drives the compressor in response to a motor control signal. A controller responds to the temperature signal and senses the cyclic parameter of the temperature signal. The controller generates the motor control signal as a function of the sensed cyclic parameter whereby the motor control signal is provided to the motor to control the torque or speed of the motor.

63 Claims, 5 Drawing Sheets

U.S. PATENT DOCUMENTS

| | | | |
|---|---|---|---|
| 4,672,816 | 6/1987 | Takahashi | 62/180 |
| 4,682,473 | 7/1987 | Rogers, III | 62/89 |
| 4,688,547 | 8/1987 | Ballard et al. | 126/116 A |
| 4,710,691 | 12/1987 | Bergstrom et al. | 318/696 |
| 4,712,050 | 12/1987 | Nagasawa et al. | 318/254 |
| 4,722,018 | 1/1988 | Pohl | 361/29 |
| 4,736,143 | 4/1988 | Nakamura et al. | 318/432 |
| 4,743,815 | 5/1988 | Gee et al. | 318/254 |
| 4,763,425 | 8/1988 | Grennan | 34/48 |
| 4,773,587 | 9/1988 | Lipman | 236/11 |
| 4,806,833 | 2/1989 | Young | 318/335 |
| 4,829,221 | 5/1989 | Grunberg et al. | 318/587 |
| 4,845,418 | 7/1989 | Conner | 318/778 |
| 4,860,231 | 8/1989 | Ballard et al. | 364/571 |
| 4,860,552 | 8/1989 | Beckey | 62/158 |
| 4,868,467 | 9/1989 | Davis | 318/254 |
| 4,872,123 | 10/1989 | Morita | 364/571 |
| 4,879,502 | 11/1989 | Endo et al. | 318/808 |
| 4,902,952 | 2/1990 | Lavery | 318/645 |
| 4,939,437 | 7/1990 | Farag et al. | 318/473 |
| 4,941,325 | 7/1990 | Nuding | 62/158 |
| 4,950,918 | 8/1990 | O'Breartuin et al. | 307/242 |
| 4,992,715 | 2/1991 | Nakamura et al. | 318/432 X |
| 5,107,685 | 4/1992 | Kobayashi | 318/807 |
| 5,119,071 | 6/1992 | Takezawa | 318/811 |
| 5,129,234 | 7/1992 | Alford | 62/176.6 |
| 5,197,375 | 3/1993 | Rosenbrock et al. | 364/557 |

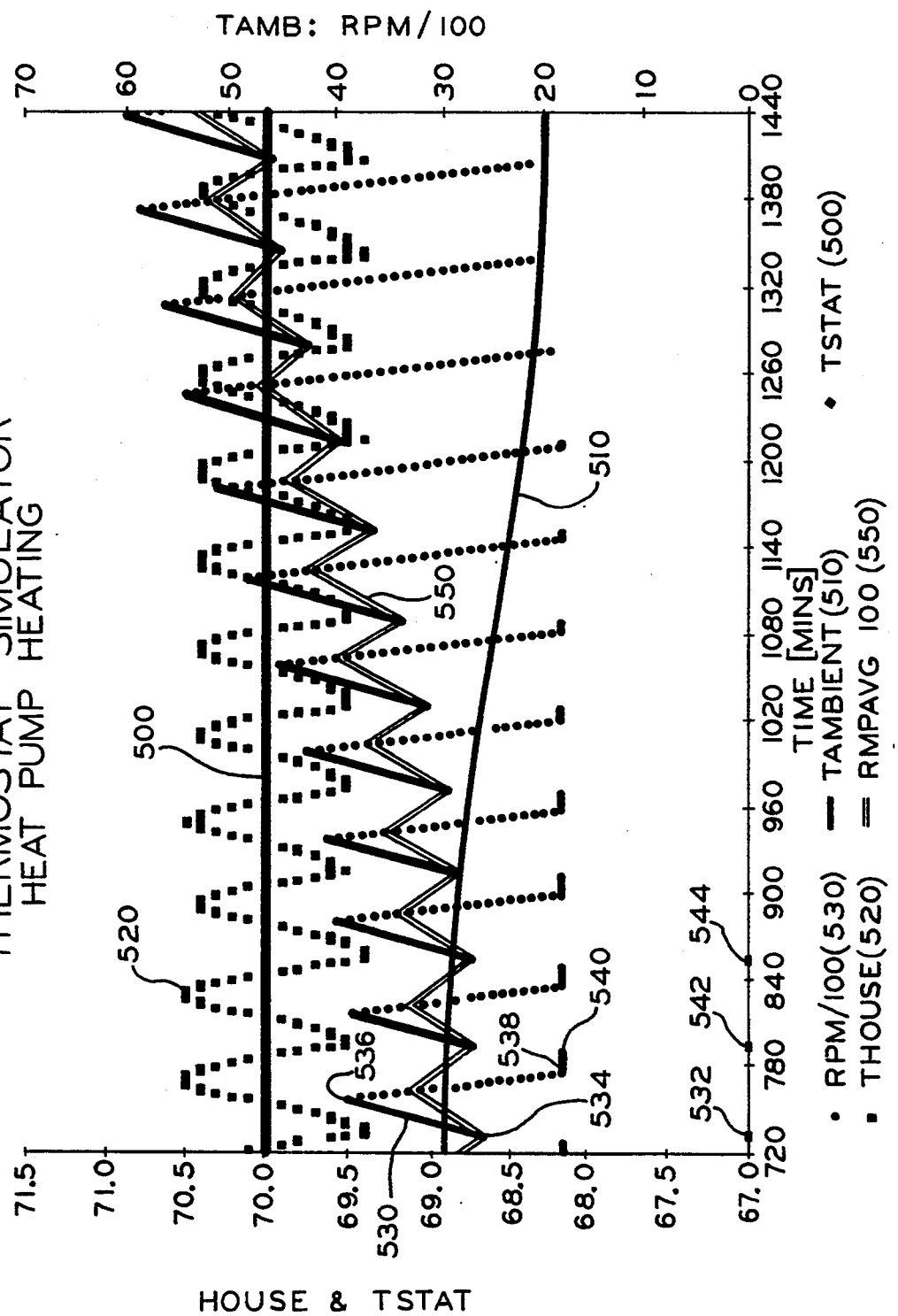

VARIABLE SPEED HVAC WITHOUT CONTROLLER AND RESPONSIVE TO A CONVENTIONAL THERMOSTAT

CROSS-REFERENCE TO RELATED APPLICATION

This application is a continuation-in-part of copending application Ser. No. 07/889,708, filed May 27, 1992, the entire disclosure of which is incorporated herein by reference.

BACKGROUND OF THE INVENTION

This invention relates to temperature and/or humidity conditioning systems generally, and more particularly to heating, air conditioning and ventilating systems and, with even more particularity, to systems having variable speed operation which is responsive to a two state temperature signal as provided, for example, by a thermostat.

Variable capacity central heating, ventilating and air conditioning (HVAC) systems are typically controlled by electronic thermostats containing microprocessors which continuously monitor indoor air temperature by a thermistor or other means. The thermostat temperature set point is compared to the sensed or monitored temperature value and the microprocessor in the thermostat evaluates this differential to generate a control signal. It should be apparent that it would be desirable to provide a system which eliminates the need for a microprocessor within a thermostat or as part of a system controller. It would also be desirable that such an improved system (or parts thereof) be generally useable for controlling the humidity or temperature of air generally.

Some HVAC systems have utilized sequencing of the outdoor fan motor, compressor, and indoor blower to maximize efficiency on start up and shut down (See, for example, U.S. Pat. No. 4,941,325). Alternatively, some systems delay operation of various components in an effort to improve air delivery temperature (See, for example, U.S. Pat. No. 4,860,552). However, these systems do not respond to environment changes and cannot be programmed to permit variable sequencing or delays depending on the temperature signal generated by a conventional thermostat.

Further, present system applications require that the starting torque and/or speed-torque characteristics of the motors be predictable and repeatable. In addition, it is desirable that motors be operable at the highest reasonably achievable efficiency consistent with mass production techniques. Known present variable speed motors cannot easily achieve this advantage because it has traditionally been impractical or too costly to minimize the variable effect on motor characteristics caused by manufacturing tolerances of the internal components of the motor. Present concepts and arrangements for adjusting a motor for different applications require circuit changes such as multiple variable resistors in the electronic control for the motor or permanent software changes in an electronic control microprocessor. Both of the aforementioned arrangements are disadvantageous because they require a unique model to be built for calibrating a system which cannot be easily changed and can be quite expensive.

SUMMARY OF THE INVENTION

It is an object of this invention to provide a central heating, air conditioning and ventilating system which does not require a system controller.

It is still another object of this invention to provide a central heating, air conditioning and ventilating system which is responsive to a cyclic parameter of a temperature signal generated by a conventional thermostat which does require a microprocessor.

It is still another object of this invention to provide a central heating, air conditioning and ventilating system wherein each motor of the system is independently controlled by a microprocessor integral with the motor/motor control.

Another object of the invention is to provide a system which permits optimum airflow for maximum comfort and/or efficiency for varied system environments.

It is yet another object of this invention to provide a system which permits calibrating a motor control to actual characteristics or operating parameters of a motor while driving a known load.

Yet another object is to provide a system which permits calibrating the motor to a known load.

A still further object is to provide a system which permits calibrating a motor control to motor characteristics under a no load condition.

Yet other objects of the present invention are to provide new and improved control techniques which may be applied to local air conditioning or heating units, refrigeration units, and humidity controlling units, whereby the above-stated objects may be carried out in applications other than central HVAC applications.

In one form, a system embodying the invention comprises a system for conditioning air in a space by heating or cooling the air to change its temperature. Means, responsive to the temperature of the air in the space, generates a temperature signal having a cyclic parameter which corresponds to the temperature of the air in the space as it rises and falls. A temperature changing means, including a refrigerant compressing means and a heat exchanging means, changes the temperature of the air. A variable speed motor drives the changing means in response to a motor control signal. Control means responds to the temperature signal and includes means for monitoring the cyclic parameter of the temperature signal. The control means generates the motor control signal as a function of the monitored cyclic parameter whereby said motor control signal is provided to the motor to control the torque or speed of the motor.

Another embodiment of the invention comprises a device for driving a component of a heating and/or air conditioning system in response to a signal provided by a thermostat. A variable speed motor having a rotatable assembly in driving relation to the component, drives the component in response to a motor control signal. A programmable nonvolatile memory shores parameters representative of the system. Selected means selects at least one stored parameter. A microprocessor, responsive to the selected parameter, generates motor control signals provided to the motor to control its speed, torque and/or air flow.

In another embodiment of the invention, the controller may be responsive to the temperature signal to sense the difference between a set point temperature and a temperature represented by the received temperature signal. The controller generates the motor control signal as a function of the difference whereby the motor control signal is provided to the motor to control the torque or speed of the motor, or the air flow of the system.

Other objects and features will be in part apparent and in part pointed out hereinafter.

BRIEF DESCRIPTION OF THE DRAWINGS

FIG. 5 is a graph illustrating refrigerant compressor RPMs, ambient temperature, set point temperature of a thermostat, temperature of the air space being monitored by the thermostat, and time average of the compressor RPMs of a system embodying the invention.

DETAILED DESCRIPTION OF THE PREFERRED EMBODIMENTS

Figure 1:
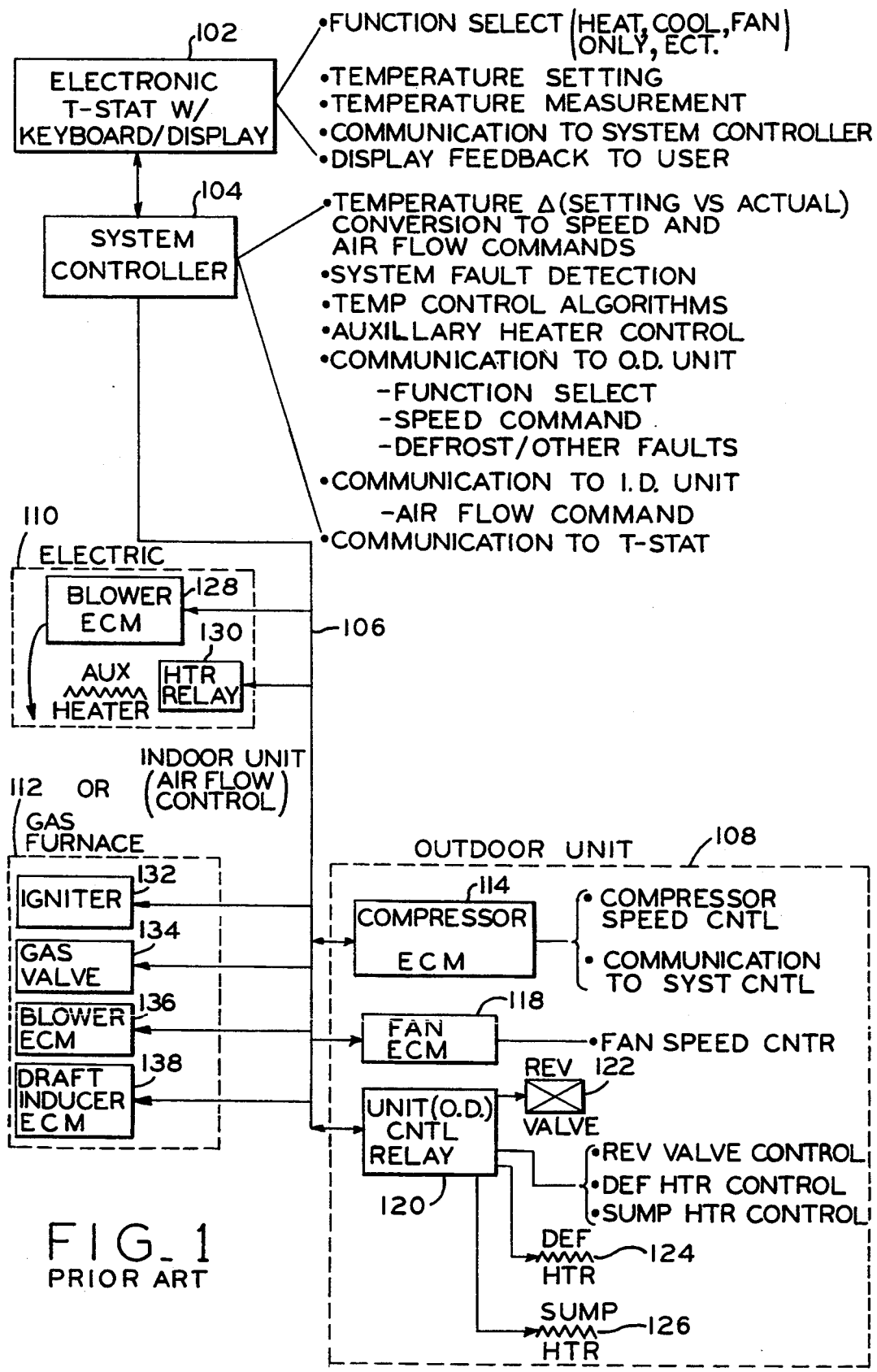
FIG. 1 is a block diagram of a typical central heating and air conditioning (CHAC) variable speed control system according to the prior art including a system controller.

Referring to FIG. 1, a typical heat pump variable speed control system now known in the art is illustrated in block diagram form. An electronic thermostat 102 including a keyboard, such as a keypad, and a display, such as an LCD or LED display, is positioned within the air space. Thermostat 102 monitors the temperature of the air space so that the air space can be heated or cooled to maintain the air temperature within a range. Generally, thermostat 102 includes a function select which permits heating, cooling, or fan only operation of the system. Thermostat 102 also includes a temperature setting device or program permitting the user to select a preset temperature indicating the desired temperature of the air space. Thermostat 102 also includes some type of device for measuring the temperature of the air surrounding thermostat 102. In response to this measured temperature, thermostat 102 provides a proportional temperature signal to a system controller 104 indicating the temperature of the air space. Thermostat 102 may also provide feedback information on its display to the user, such as confirming the programming or selection of the condition of the thermostat.

System controller 104 monitors the difference between the actual temperature of the air and the preset temperature which is desired, both of which are indicated by electronic thermostat 102. This temperature difference is converted into a signal defining the speed and airflow rate of the system. This signal is provided via bus 106 to the indoor and outdoor units as commands for controlling the speed and airflow rates. Generally, system controller 104 also includes a microprocessor or other means for detecting system defaults and an algorithm which determine the actual temperature control. If the system has an auxiliary heater 130, system controller 104 includes an auxiliary heater control which provides information to control the auxiliary heater via control bus 106. System controller 104 communicates to the outdoor unit 108 via bus 106 providing information such as the functional selection as specified by thermostat 102, speed commands as determined by the temperature differential, defrost controls for defrosting cycling and fault conditions. System controller 104 also communicates to the indoor unit 110 or 112 via bus 106 to specify an airflow command. Also, system controller 104 communicates with the thermostat 102 to provide feedback information to the user.

Outdoor unit 108 includes a compressor 114 such as an electronically commutated motor (ECM) for driving a compressor. The compressor drive 114 may include a microprocessor or other circuit for controlling the compressor speed and means for communicating with the system controller 104. The outdoor unit 108 also includes a fan 118 including a speed control. Finally, outdoor unit 108 includes a control relays unit 120 which controls the reversing valve 122 of the refrigeration system, a defrost heater 124 activated to defrost the refrigeration system, and a sump heater 126 used for heating the sump compressor.

Tile electrical indoor unit 110 includes a blower ECM 128 and heater relays 130 for operating an auxiliary heater(s). Alternatively, a gas furnace indoor unit 112 includes an igniter 132 for igniting gas, a gas valve 134 for selectively providing gas, a blower ECM 136 and an optional draft inducer ECM 138, all operating in response to the system controller 104 which provides signals via bus 106.

Figure 2:
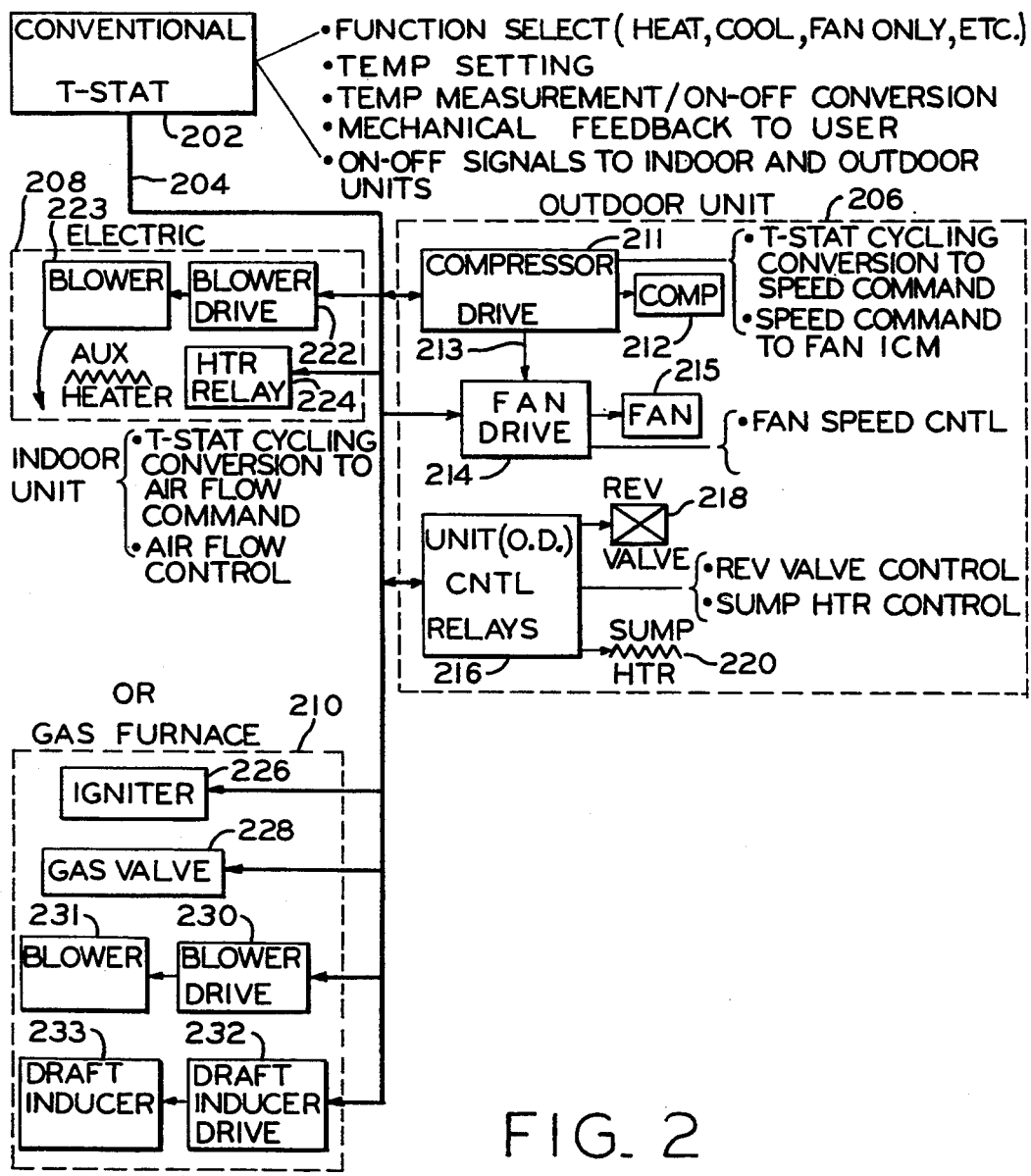
FIG. 2 is a block diagram of a central heating and air conditioning (CHAC) variable speed control system embodying a preferred form of the present invention that does not require a system controller interposed between a thermostat and the remainder of the system.

Referring now to FIG. 2, one preferred embodiment of a system according to the invention is shown in block diagram form. As compared to FIG. 1, the system of the invention illustrated in FIG. 2 eliminates the need for system controller 104. In particular, a conventional thermostat 202 is directly connected to a bus 204 which supplies information to both an outdoor unit 206 (e.g., compressor and condenser units when working as an interior air cooling system; and compressor and evaporator units when working as a heat pump system) or alternative indoor units 208 and 210. The conventional thermostat 202, such as a mechanical switch generating a two state (on/off) signal, includes a function select feature which permits the user to select heating, cooling or fan only operation. (In a room air conditioner or refrigeration environment, a heating option is not normally provided, although a defrost or fan only setting may be provided, as will be understood). In addition, thermostat 202 has a temperature setting feature which permits the user to indicate a preselected temperature which is the desired temperature of the air surrounding the thermostat. Thermostat 202 also includes a device for measuring the temperature of the air surrounding the thermostat and generating a temperature signal such as an on/off signal provided via bus 204 to the indoor air moving and the compressor and condenser or evaporator outdoor units (in FIG. 3). The temperature signal has a cyclic parameter corresponding to the temperature of the air surrounding the thermostat. For example, the temperature signal for heating may be a two stake (on/off) signal indicating that the air temperature is below/above the preselected temperature. Similarly, the temperature signal for cooling may be an on/off signal indicating that the air temperature is above/below the preselected temperature. Preferably, the thermostat 202 includes a feedback to the user indicating the approximate preset or desired temperature (e.g., a mechanical dial or digital readout).

The on/off signals generated by thermostat 202 are provided via bus 204 to the compressor and condenser (or evaporator) unit 206. The unit 206 includes a compressor with microprocessor control 211 such as an ECM which drives a compressor 212. The integral control of the compressor 211 monitors the thermostat duty cycle or other cyclic parameter of the on/off signal provided by thermostat 202. This monitored parameter is converted into a speed command which is used to control compressor 211 and may also be provided via line 213 to a condenser or evaporator fan ECM 214 to control the speed of a fan 215.

Illustrated outdoor unit 206 also includes a control relay unit 216 responsive to the temperature signal for controlling a reversing valve 218 and a sump heater 220. It is to be expressly understood, however, that features such as these are not necessary for the practice of our invention.

The on/off temperature signals generated by thermostat 202 are also provided via bus 204 to an indoor condenser/evaporator heat exchanging unit such as the indoor heat exchanger unit 208. This unit includes a blower ECM motor 222, a blower 223 and a heater relay 224. Both blower ECM 222 and heater relay 224 have integral controls for converting the thermostat temperature signal cycling into an airflow signal command and generating an airflow control signal. Alternatively, the indoor unit may be a gas furnace unit 210 having an igniter 226 and a gas valve 228 responsive to the on/off thermostat signal. Additionally, the gas unit 210 may include, as illustrated, a heat exchanger blower ECM motor 230 having an integral control responsive to the temperature signal cycling for driving a blower 231. Gas unit 210 may also include an optional draft inducer ECM motor 232 (also responsive to such cycling) for driving a draft inducer 233.

Figure 3:
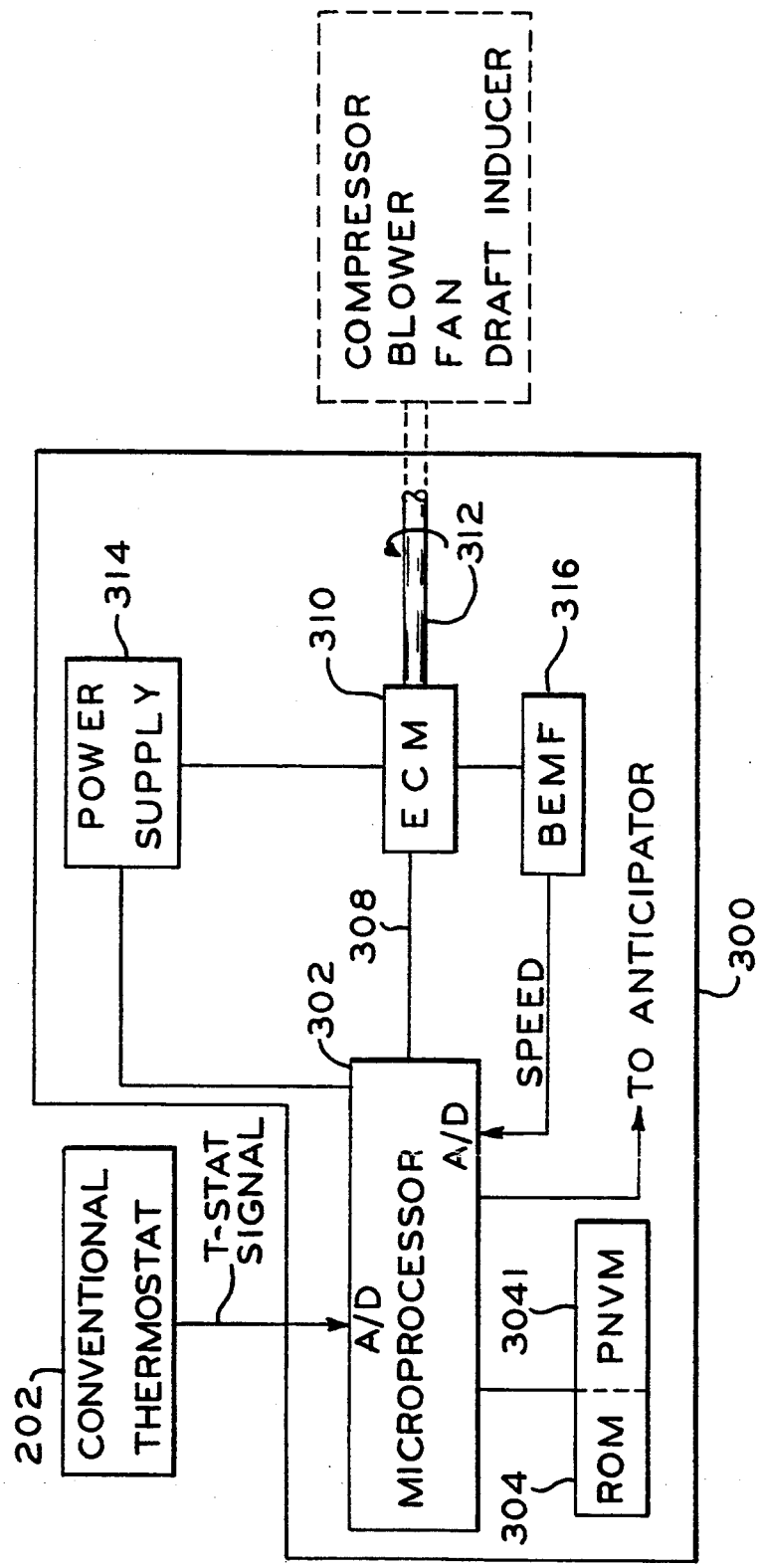
FIG. 3 is a block diagram of an electronically commutated motor (ECM) drive system particularly adapted for carrying out the invention, the system including a control system responsive to a two state temperature (T-STAT) signal.
Figure 4:
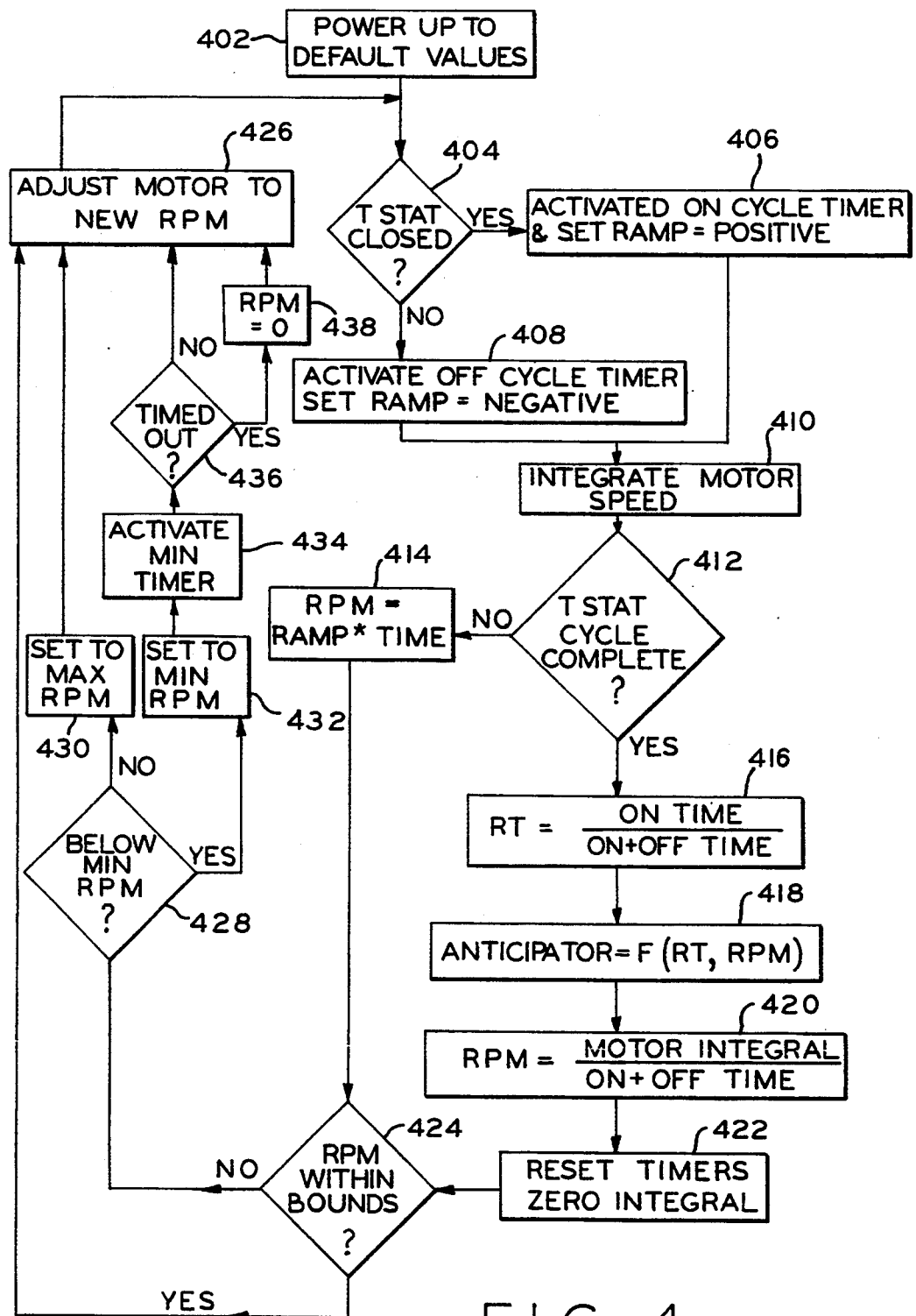
FIG. 4 is flow chart of one preferred embodiment of software which may be used to control the operation of a system embodying the invention in one form thereof.

FIG. 3 is a block diagram of an ECM drive system 300 that may be used for driving a compressor motor, fan motor, blower motor, or draft inducer fan motor as employed in the system illustrated in FIG. 2. Referring to FIG. 3, system 300 includes a microprocessor 302 for receiving the on/off temperature signal. A read only memory (ROM) 304, having software such as illustrated in FIG. 4, may be used to control the operation of the microprocessor 302. Microprocessor 302 provides a speed or torque control signal via line 308 to an electronically commutated motor 310 to control the speed or torque of the motor. Motor 310 has a rotatable assembly mechanically connected via shaft 312 to the particular compressor, blower, fan or draft inducer fan motor which it is driving. System 300 includes a power supply 314 which provides low voltage power to operate the microprocessor 302 and also provides relatively higher voltage power to power the electronically commutated motor 310. Motor 310 may include means for sensing the position of its rotatable assembly such as a circuit 314 for back electromotive force (BEMF) sensing which provides a speed signal to which microprocessor 302 is responsive. Alternatively, other means such as, for example, hall devices may be used to indicate rotor position. Microprocessor 302 may include an analog-to-digital converter for converting the temperature (T-STAT) signal provided by conventional thermostat 202 and/or the speed signal into a digital signal which is timed to determine the duty cycle of each state.

FIG. 2 illustrates a system embodying a preferred form of the invention for conditioning air in a space by heating or cooling the air to change its temperature. Conventional thermostat 202 constitutes means for generating a temperature signal having a cyclic parameter corresponding to the temperature of the air space as it rises and falls. This temperature signal is provided via bus 204. The indoor units 208 and 210 constitute means for changing the temperature and/or moisture content of the air. As shown in FIG. 3, ECM 310 constitutes a variable speed motor responsive to a motor control signal provided by microprocessor 302 via line 308 for driving the various portions of the system in response to the motor control signal. The microprocessor 302 constitutes control means responsive to the temperature signal on bus 204 provided by thermostat 202. The microprocessor receives the temperature signal and monitors the cyclic parameter of the temperature signal to generate the motor control signal provided via line 308 as a function of the monitored cyclic parameter. The control signal provided via line 308 is provided to ECM 310 as a motor control signal to control the torque or speed of the motor. In one preferred embodiment, the cyclic parameter comprises the on/off cycling rate of the two state temperature signal.

As shown in FIG. 3, the microprocessor 302 may include a programmable, non-volatile (PNV) memory 3041 storing parameters representative of the system such as time constants which are a function of the thermal mass of the structure being heated and/or cooled. Alternatively, memory 3041 may store parameters representative of the system characteristics which are used by micrporocessor 302 to determine operation of motor 310. PNV memory 3041 may be an electrically eraseable programmable read only memory (EEPROM). The microprocessor 302 may have a keypad or dip switches (not shown) responsive to operator input for selecting at least one of the stored parameters. The microprocessor 308 generates control signals via line 308. Preferably, during operation in the cooling and/or heating mode, the microprocessor increases speed/airflow rate when the duty cycle of the temperature signal is above a preset maximum. The microprocessor 302 decreases speed/airflow rate when the duty cycle of the temperature signal is below a preset minimum. In other words, if the thermostat calls for cooling for extended periods of time, the speed of the compressor and heat exchanger motors may be increased in order to increase the cooling capacity of the system, so that more rapid cooldown may be achieved. On the other hand, if the thermostat rapidly cycles between "on" and "off", the compressor and heat exchanger motors may be slowed in order to achieve better humidity control and/or more efficient operation.

In addition, it is contemplated that the cyclic parameter may comprise the difference between a set point temperature of the thermostat and a temperature represented by the received temperature signal.

In general, the thermostat may have contacts which close and open to provide the on/off or two state temperature signal and also may have an anticipator which anticipates the opening of the thermostat contacts. In order to further enhance the efficiency, control and operation of the system according to the invention, microprocessor 302 may provide an output signal which adjusts the power level provided to the anticipator of the thermostat 202 as a function of the period of time during which the contacts of the thermostat 202 are closed. In general, the power level of the anticipator may be adjusted as a function of the duty cycle of the temperature signal. The power level provided to the anticipator would decrease in response to an increase in the duty cycle of the temperature signal. This decrease may occur according to a linear algorithm. For example, the algorithm may be as follows:

$$QU1 = UBAS1 - USLP1 * RTEFF$$

wherein QU1 defines the anticipator value for the current cycle selected as a function of the duty cycle; UBAS1 defines the baseline steady state anticipator temperature rise; USPL1 defines the slope of the linear relation between the anticipator value and the duty cycle; and RTEFF is the duty cycle modified to account for a change in the motor rpm from start of last cycle to start of current cycle.

Alternatively, the algorthim may be:

$$QU1 = UBAS1 - USLP1 * RTIME$$

wherein QU1 defines the anticipator value for the current cycle selected as a function of the duty cycle; UBAS1 defines the baseline steady state anticipator temperature rise; USPL1 defines the slope of the linear relation between the anticipator value and the duty cycle; and RTIME is the duty cycle.

If the system embodying the invention includes a heat pump or air conditioning compressor driven by the ECM 310, it is contemplated that the device being driven would have a predefined operating speed range. In this case, in one particular preferred embodiment of the invention, microprocessor 302 would initially operate the compressor at the mid-point of its operating range. The operating speed would increase over time at a fixed rate during the period that the thermostat indicated that the temperature of the air required additional conditioning. Furthermore, the microprocessor would decrease the operating speed of the compressor over time at a rate which is greater than the fixed rate of increase.

Additionally, the EEPROM 3041 may have one or more of the following parameters stored therein: speed or air flow rate for various operating modes such as a heating mode and a cooling mode; speed or air flow rates for different system capacities such as tons of cooling and kilowatts of heating; parameters defining turn-on and turn-off time delays; parameters defining motor speed or torque changes over time; parameters defining the relationship between motor torque and air flow; parameters defining the relationship between motor speed and air flow; and parameters defining direction of rotations; and wherein the control signals generated by the microprocessor 302 are a function of at least one of the stored parameters. Alternatively, the EEPROM 3041 may include a parameter stored therein which is representative of a difference between the actual power input into the system and the expected nominal power so that the control signals generated by the microprocessor 302 are a function of the difference.

Referring to FIG. 3, variable speed motor 310 has a rotatable assembly, or rotor, in driving relation to a component such as a compressor, blower, fan or draft inducer. System 300 is responsive to the control signals and has programmable nonvolatile (PNV) memory 3041 which stores parameters representative of system 300. The motor control signal provided by microprocessor 302 is responsive to at least one of the stored parameters plus the parameters selected in response to the parameter select signal and to the system control signal. System 300 provides the motor control signal to ECM 310 to control its speed or torque. ROM 304 stores instructions which control the operation of microprocessor 302. The microprocessor 302 constitutes means responsive to the control signals provided by thermostat 202. The microprocessor 302 receives the temperature signal and monitors it to generate the motor control signal provided via line 308 as a function of the temperature signal and the stored parameters.

Various time constants may be stored in PNV memory 3041 which correspond to various parameters of various environments. Microprocessor 302 may be programmed at the factory or during field installation to select time constants corresponding to the environments within which the indoor unit including system 300 is being installed. The stored parameters may correspond to a constant CFM calibration, i.e., representative of a calibrated operation of the ECM 310 driving a predetermined, known load so that microprocessor 302 would be accurately responsive to the stored parameters. Means for selecting parameters for calibration according to the invention is disclosed in co-pending application Ser. No. 07/889,708 filed May 27, 1992, which is incorporated herein by reference.

As part of the process of manufacture, system 300 is operated with a known calibration load with a predetermined current versus speed characteristic. This load, for example, could be all ECM driving a blower wheel with a known restriction to the flow of air. It could also be an artificial load which electronically simulates the loading characteristics and waveforms present at the terminals of motor 310. The system 300 is calibrated by running it on this calibration load and commanding it to deliver, in sequence, one or more current levels to the load. For example, it may first be commanded to provide the full or maximum current level and then a relatively low current level. In each case, the actual current delivered by the system 300 is measured either directly or indirectly by measuring the speed achieved on the calibration load. Due to circuit tolerances within the particular system 300, the actual current values may be somewhat different from the correct or nominal values. This actual information generates a current offset factor and a multiplier factor compensating for the inaccuracies within the system 300. The compensation factors are stored permanently in the PNV memory 3041. In this manner, the system 300 is calibrated to compensate for the tolerance variations of its internal components.

Alternatively, the parameters may be representative of a calibrated operation of ECM 310 driving no load so that the microprocessor 302 is accurately responsive to such stored parameters. In the case of ECM 310, an alternate simplified method of calibration may be used. The system 300 is run at no load and the no load speed is measured. No load speed is a very good indicator of rotor magnetization level which is the predominant cause of torque variations. Storing this information along with the previously obtained control calibration information in an EEPROM used as PNV memory 3041 allows subsequent compensation for most of such tolerance variations. No load motor tests are much less time consuming than load tests and do not require a dynamometer. As such, they are routinely performed anywhere. The built-in microprocessor 302 in the control can by itself measure the no load speed and store the data in the PNV memory 3041, requiring minimal external equipment.

Alternatively, the parameters stored in PNV memory 3041 may be representative of an operation of a particular motor 310 in combination with a particular system 300 to provide a representative operation of particular motor 310. For example, the stored parameters may represent the difference between the actual torque generated by a particular motor 310 and the nominal values thereby representing the combined inaccuracies of the particular motor 310 in combination with the microprocessor 302. In a number of applications, the system 300 and the motor 310 are physically attached together and distributed as a single unit. In such cases, the system 300 would be programmed with not only its own inaccuracies but also those of the motor 310 to which it is attached.

Generally, the system 300 without motor 310 is first calibrated by one of the methods described above. The calibrated system is then connected to the motor 310. The system and motor combination are then calibrated, for example, by running them on a loading/measuring device such as a dynamometer. Certain torque level(s) are commanded of the system 300 and motor 310 and the resulting actual torques are measured. The difference between the actual torques and the correct or nominal values represents the combined inaccuracy of the system and the motor. This information is stored in the PNV memory 3041 to enable the microprocessor 302 to produce near-nominal torque in the actual operation by compensating for the tolerance inaccuracies of both motor 310 and system 300.

This correlation between actual and nominal values may be extended beyond improvement of system and motor combination accuracy to calibration of variations in the target system. A typical application for variable speed motors is driving blower wheels in gas furnaces or indoor fan coil units of central heating and air conditioning systems. The key performance parameter is blower air flow which depends on motor speed-torque characteristics, restriction level (static pressure) in an installation, and physical characteristics of the blower wheel such as blade pitch, etc. Methods have been previously devised to generally compensate for the static pressure variations, making the air flow somewhat independent of installation. However, to achieve the best air flow accuracy, unit to unit variations due to blower wheel characteristics need to be calibrated out. This can be accomplished in the following manner. A calibrated system and motor combination is installed in the particular blower wheel of a furnace or fan coil unit. The inlet and outlet openings of the unit are kept at a predetermined level, including completely open, thus, ensuring a known restriction level. Operation of the motor 310 with a certain temperature signal provided to microprocessor 302 should then result in a predictable nominal blower speed or power. The actual blower speed or power is measured and its deviation from nominal represents the inaccuracy of the blower wheel. This information is stored in the PNV memory 3041 so that microprocessor 302 can compensate in actual operation.

In one preferred embodiment, memory 3041 comprises an EEPROM having one or more of the following parameters stored therein: speed or air flow rate for various operating modes such as a heating mode and a cooling mode; speed or air flow rates for different system capacities such as tons of cooling or kilowatts of heating; parameters defining turn-on and turn-off time delays; and parameters defining direction of rotation. Each parameter may also differ depending on the mode of operation. For example, the following modes may be used: heat pump, backup heat, emergency heating, dehumidifier, fan only, or other modes. As a result, the motor control signals generated by microprocessor 302 and provided via line 308 would be a function of at least one or more of the stored parameters.

As noted above, it is also contemplated that the memory 3041 may include a correction factor (such as a current offset or a multiplier) for tolerance inaccuracies of the any one or more portions of the system. For example, the memory 3041 may include a parameter stored therein which is representative of the difference between the actual current being delivered to the motor 310 and the expected nominal current. As a result, the motor control signals provided by microprocessor 302 via line 308 would be a function of this stored correction factor parameter.

The parameters stored in the memory may also be representative of the difference between the actual speed of the component being driven by the motor or the actual power input (watts) into the motor 310 and the expected nominal speed or input power so that the motor control signal generated by the microprocessor 302 would be a function of this stored parameter.

Referring to FIG. 4, a flowchart illustrating the operation of microprocessor 302 is shown. Initially, when the system is powered up, microprocessor 302 would operate the system according to the default values as indicated by step 402. Microprocessor 302 monitors the temperature signal provided by thermostat 202 and initially determines at step 404 whether the thermostat contacts are closed thereby calling for a temperature change such as additional heat or additional cooling. If the contacts are closed, step 406 is executed to activate the on cycle timer and set the ramp as positive (or increasing) meaning that the motor speed will be ramped up or increased. If the contacts are open, step 408 activates the off cycle timer and sets the ramp as negative or decreasing. In either case, at step 410 the microprocessor 302 integrates the motor speed over time. At step 412 the microprocessor 302 determines whether a full thermostat cycle is complete. If the cycle is incomplete, step 414 sets the new rpm level for the ECM 310 to be equal to the ramp value multiplied by the time. On the other hand, if the cycle is complete, microprocessor 302 proceeds to step 416 to determine the run time ratio (RT) which is equal to the on-time divided by the total of the on-time and off-time. At step 418, the power signal indicating the power level to be provided to the anticipator is adjusted as a function of the run-time and the rpms (speed., in revolutions per minute) of the motor. Next, at step 420 the new rpm level is calculated by dividing the motor speed integral by the total of on-time and off-time. Finally, microprocessor 302 resets the timers to a zero integral at step 422.

From steps 414 and 422, the microprocessor 302 proceeds to step 424 to evaluate the new rpm level and determine whether it is within preset bounds or limits. If it is, the microprocessor 302 proceeds to adjust the motor speed to the new rpm level at step 426 and returns to step 404 to evaluate the condition of the contacts of the thermostat 202.

If the new rpm level is not within the preset bounds, microprocessor 302 proceeds to step 428 to determine whether the level is above or below the preset bounds. If the rpm level is not below the minimum rpm setting stored in memory as determined by step 430, the result is that the rpms must be above the maximum so that the rpms are set to maximum by step 430. If the rpm level is below the minimum rpm setting stored in memory as determined by step 428, the rpm level is set to the minimum by step 432. If set to maximum by step 430, the microprocessor 302 proceeds to adjust the motor speed to the new rpm level at step 426 and continues operation by monitoring the thermostat contacts by step 404. If the motor speed is set to minimum, microprocessor 302 activates the minimum timer at step 434. At step 436 the microprocessor 302 evaluates whether or not the minimum time has been timed out in which case the rpm level is set to zero at step 438. Otherwise, the microprocessor proceeds to step 426 to adjust the rpm level and continue monitoring the thermostat contacts.

In summary, when the system 300 is powered up for the first time or reenergized after a power outage, the motor 310 waits for thermostat contacts closure and then starts at the midpoint of its operating speed range. Assuming that refrigeration or cooling is being called for, or that heat is called for and the compressor is operable in a heat pump mode, as long as the first stage thermostat contacts remain closed, the motor operates so that compressor rpm will increase at a fixed preset rate. Once the thermostat 202 is satisfied and its contacts open, the compressor rpm will decrease at a fixed preset rate. Preferably the rate of decrease is different from the rate of increase for best performance.

The length of time the thermostat contacts are closed and the length of time they are open is recorded by a timing circuit incorporated into the ECM microprocessor 302. Once a complete contacts closed/contacts open cycle is sensed, the microprocessor 302 computes fraction closed time and adjusts the power level,of the anticipator to be used for the next cycle. Anticipator power decreases with increasing duty cycle to avoid thermostat "droop". The algorithm to adjust anticipator power as a function of contacts closed time fraction is programmed into ROM 304, and a linear relationship is preferred.

Once a complete contacts closed/contacts open cycle is sensed, the microprocessor 302 also calculates the correct starting speed for the next cycle. This is accomplished by a time averaging of speed over the previous cycle. The time averaged speed is weighted with the current motor speed at the start of each new cycle and the motor 310 is rapidly ramped up to this new setting. When heating is called for, a heavy weighting of the current speed damps system response in exchange for increased backup heating. The second stage thermostat which activates electric resistance heat is more likely to be tripped if the motor speed changes are heavily damped. Preferably, little or no weighting of current speed is necessary if the proper speed ramp rates are selected.

The microprocessor 302 will store maximum and minimum allowable rpm values which the motor 310 will not exceed. If minimum speed is reached, a timer sequence starts which shuts the motor 310 off after a preset elapsed time. Motor shut off avoids overheating the conditioned space when operating in mild weather. A second optional timer sequence call also be used to rapidly ramp the motor 310 up to maximum speed after a preset elapsed contacts closed time. This may be necessary if the specified speed ramp up rate is not large enough to avoid frequent use of backup resistance heat in cold weather.

Referring to FIG. 5, a graph of a thermostat simulation of heat pump heating in accordance with the invention is illustrated. The abscissa indicates time in 60 minute intervals. The abscissa begins at time 720 minutes in order to illustrate a somewhat steady state condition. Line 500 indicates that the set point of the thermostat has been set at 70.0° as indicated by the left ordinate axis. Line 510 represents the external ambient air temperature and indicates that the temperature is dropping over this period of time from approximately 30° to 20° as indicated by the right ordinate axis.

Line 520 indicates the temperature of the air within the house and surrounding the themostat and illustrates that it is maintained within a constant range of approximately 69.5° to 70.5° as indicated on the left ordinate axis.

Line 530 indicates the rpms of the motor 310. At time 730, the motor rpms are zero as indicated by point 532. Immediately thereafter, the system 300 calls for heat so that the microprocessor 302 begins operating the motor 310 at its mid-point range of approximately 2500 rpms as indicated by point 534 read on the right ordinate axis. The motor speed ramps up at a fixed linear rate. At point 536, the rpms reach approximately 4000 at which point the thermostat contacts open. Thereafter, the rpms are ramped downward at a fixed linear rate of approximately twice the linear rate of increase until they reach a minimum level of approximately 1800 rpms at point 538. At point 540 the minimum time period is timed out (step 436) so that the motor 310 is turned off to zero rpms as indicated by point 542. Thereafter, the cycle repeats itself. The minimum rpms are again timed out at point 544. However, operation after that point does not include any minimum timeouts because the decreasing external ambient temperature results in increasing operation of the compressor in heat pump mode so that the motor never reaches a zero timeout. Line 550 indicates the average rpms over time.

While the foregoing description has made particular reference to central HVAC systems, it will be understood that advantageous use of our inventions may be made with local or room HVAC systems, individual air conditioning or dehumidifying units, and domestic or commercial refrigeration units. Compressors and the fluids compressed thereby as described herein, as well as heat exchangers that exchange heat with air (both for heating and cooling) constitute means for changing the temperature of air as referred to herein. In this context, it is to be understood that motors drive such compressors, and that motors also drive the blower or fan portions of the heat exchangers. Furthermore, when the heat exchanger is referred to as an "evaporator", heat is desirably transferred (usually from air) to the evaporator and the fluid contained therein; whereas when the heat exchanger is referred to as a "condenser", heat is desirably transferred away from the condenser and the fluid contained therein.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for conditioning air in a space by heating or cooling the air to change its temperature, said system comprising:

a circuit, responsive to the temperature of the air in the space, for generating a two state temperature signal having cycles including a DEMAND state and a NO DEMAND state, each said state corresponding to a difference between the temperature of the air in the space and a set point temperature;

means for changing the temperature of the air;

at least one motor driving the changing means at a speed or torque defined by a motor speed/torque control signal; and a control responsive to the temperature signal and including means for sensing a DEMAND cycle time period during which the temperature signal is in the DEMAND state and for sensing a NO DEMAND cycle time period during which the temperature signal is in the NO DEMAND state, said control generating the motor speed/torque control signal as a function of both the DEMAND cycle time period and the NO DEMAND cycle time period whereby said motor speed/torque control signal is provided to the at least one motor to control the torque or speed of the at least one motor dependent upon the period of time between each successive state change.

2. The system of claim 1 wherein said motor has a rotatable assembly in driving relation to the changing means; said system further comprising means for sensing the position of the rotatable assembly and providing a position signal to the control, said control being responsive to the position signal.

3. A system for conditioning air in a space by heating or cooling the air to change its temperature, said system comprising:

a circuit, responsive to the temperature of the air in the space, for generating a two state temperature signal having a DEMAND state and a NO DEMAND state, each said state corresponding to a difference between the temperature of the air in the space and a set point temperature;

means for changing the temperature of the air;

a first motor driving the changing means in response to a motor control signal; and a first control responsive to the temperature signal and including means for sensing a DEMAND cycle time period during which the temperature signal is in the DEMAND state and for sensing a NO DEMAND cycle time period during which the temperature signal is in the NO DEMAND state, said control generating the motor control signal as a function of both the DEMAND cycle time period and the NO DEMAND cycle time period;

means for moving the air;

a second motor driving the moving means in response to a second motor control signal; and a second control responsive to the temperature signal and including means for sensing the period of time between state changes of the temperature signal, said second control being independent of said first control and generating the second motor control signal as a function of both the DEMAND cycle time period and the NO DEMAND cycle time period whereby said second motor control signal is provided to the second motor to control the second motor independently of the control of the first motor as controlled by the first control.

4. The system of claim 1 wherein the control comprises:

a memory for storing parameters representative of the system;

means for selecting parameters corresponding to the system; and a microprocessor responsive to one or more shored parameters, said microprocessor generating the motor control signal responsive to the selected parameters.

5. The system of claim 4 wherein the memory comprises a programmable, nonvolatile memory for storing various parameters which correspond to various characteristics of various systems such as time constants which are a function of the thermal mass of the structure being heated and/or cooled.

6. The system of claim 4 wherein the memory comprises a memory for storing calibrating parameters representative of operation of said motor driving a predetermined load and wherein said microprocessor controls the microprocessor as a function of the calibrating parameters.

7. The system of claim 6 wherein the calibrating parameters include a current offset and a multiplier.

8. The system of claim 4 wherein the memory comprises a memory for storing calibrating parameters representative of operation of said motor driving no load and wherein said microprocessor controls the microprocessor as a function of the calibrating parameters.

9. The system of claim 8 wherein the calibrating parameters include current offset and a multiplier.

10. The system of claim 4 wherein said memory stores parameters representative of an operation of said motor in combination with the system.

11. The system of claim 10 wherein the stored parameters represent the difference between the actual torque generated by the motor and the nominal values thereby representing the combined inaccuracies of the motor in combination with the system.

12. The system of claim 10 wherein the parameters correspond to a constant CFM calibration.

13. The system of claim 4 wherein the memory comprises an EEPROM having one or more of the following parameters stored therein: speed or air flow rate for various operating modes such as a heating mode and a cooling mode; speed or air flow rates for different system capacities such as tons of cooling and kilowatts of heating; parameters defining turn-on and turn-off time delays; parameters defining motor speed or torque changes over time; parameters defining the relationship between motor torque and air flow; parameters defining the relationship between motor speed and air flow; and parameters defining direction of rotation; and wherein the motor control signal generated by the microprocessor is a function of at least one of the stored parameters.

14. The system of claim 4 wherein the memory includes a correction factor for tolerance inaccuracies.

15. The system of claim 4 wherein the memory includes a parameter stored therein which is representative of a difference between the actual current being delivered to the motor and the expected nominal current and wherein the motor control signal generated by the microprocessor is a function of the difference.

16. The system of claim 4 wherein the motor has a rotatable assembly including a rotor in driving relation to the changing means and wherein the memory includes a parameter stored therein which is representative of a magnetization level of the rotor and wherein the motor control signal generated by the microprocessor is a function of the magnetization level.

17. The system of claim 4 wherein the memory includes a parameter stored therein which is representative of a difference between the actual torque being delivered to the motor and the expected nominal torque and wherein the motor control signal generated by the microprocessor is a function of the difference.

18. The system of claim 4 wherein the memory includes a parameter stored therein which is representative of a difference between the actual speed of the motor and the expected nominal speed and wherein the motor control signal generated by the microprocessor is a function of the difference.

19. The system of claim 4 wherein the memory includes a parameter stored therein which is representative of a difference between the actual power input into the system and the expected nominal power and wherein the motor control signal generated by the microprocessor is a function of the difference.

20. The system of claim 1 wherein the control includes a microprocessor and wherein during operation the microprocessor generates a speed/torque control signal which increases motor speed/torque of a subsequent one of the cycles when the duty cycle of the temperature signal of a previous one of the cycles is above a preset maximum and the microprocessor generates a speed/torque control signal which decreases motor speed/torque of a subsequent one of the cycles when the duty cycle of the temperature signal of a previous one of the cycles is below a preset minimum.

21. The system of claim 1 wherein the temperature signal generating circuit comprises a thermostat having contacts which close to provide the temperature signal and having an anticipator which anticipates the opening of the contacts and further comprising means for adjusting a power level provided to the anticipator during a subsequent one of the cycles as a function of the period of time during which the contacts of thermostat are closed during a previous one of the cycles.

22. The system of claim 1 wherein the temperature signal generating circuit comprises a thermostat having an anticipator and further comprising means for adjusting a power level provided to the anticipator during a subsequent one of the cycles as a function of the duty cycle of the temperature signal during a previous one of the cycles.

23. The system of claim 22 wherein the adjusting means decreases the power level provided to the anticipator during the subsequent cycle in response to an increase in the duty cycle of the temperature signal during the previous cycle.

24. The system of claim 22 wherein the adjusting means decreases according to a linear algorithm the power level provided to the anticipator during the subsequent cycle in response to an increase in the duty cycle of the temperature signal during the previous cycle.

25. The system of claim 24 wherein the linear algorithm comprises:

$$QU1 = UBAS1 - USLP1 * RTEFF$$

wherein QU1 defines the anticipator value for the current cycle selected as a function of the duty cycle; UBAS1 defines the baseline steady state anticipator temperature rise; USLP1 defines the slope of the linear relation between the anticipator value and the duty cycle; and RTEFF is the duty cycle modified to account for a change in the motor rpm from start of last cycle to start of current cycle.

26. The system of claim 24 wherein the linear algorithm comprises:

$$QU1 = UBAS1 - USLP1 * RTIME$$

wherein QU1 defines the anticipator value for the current cycle selected as a function of the duty cycle; UBAS1 defines the baseline steady state anticipator temperature rise; USPL1 defines the slope of the linear relation between the anticipator value and the duty cycle; and RTIME is the duty cycle.

27. A system for conditioning air in a space by heating or cooling the air to change its temperature, said system comprising:
  a thermostat, responsive to the temperature of the air in the space, for generating a two state temperature signal having a DEMAND state and a NO DEMAND state;
  a compressor for changing the temperature of the air;
  a motor driving the compressor at a speed or torque defined by a motor speed/torque control signal;
  a control responsive to the temperature signal and including means for sensing a DEMAND cycle time period during which the temperature signal is in the DEMAND state, said control generating the motor speed/torque control signal as a function of the DEMAND cycle time period whereby said motor speed/torque control signal is provided to the motor to control the torque or speed of the motor as a function of the DEMAND cycle time period.

28. The system of claim 27 wherein the control comprises:
  a memory for storing calibrating parameters representative of operation of said motor driving a predetermined load;
  means, responsive to the calibrating parameters and to the temperature signal, for generating the motor control signal to control motor speed or torque.

29. The system of claim 28 wherein the calibrating parameters represent operation of the motor driving no load.

30. The system of claim 28 wherein the calibrating parameters include a current offset and a multiplier.

31. The system of claim 27 wherein the compressor has a predefined operating speed range and wherein said control initially operates the motor to drive the compressor at the midpoint of the range.

32. The system of claim 27 wherein the compressor has a predefined operating speed range and wherein said control operates the motor to drive the compressor at a speed within the range which speed is increasing at a fixed rate during the period that the thermostat indicates the DEMAND state.

33. The system of claim 32 wherein said control operates the motor to drive the compressor at a speed within the range which speed is decreasing at a rate greater than the fixed rate during the period that the thermostat indicates the NO DEMAND state.

34. A method for conditioning air in a space by heating or cooling the air to change its temperature, said method comprising:
  generating in response to the temperature of the air in the space a two state temperature signal having cycles including a DEMAND state and a NO DEMAND state, each state corresponding to a difference between the temperature of the air in the space and a set point temperature;

changing the temperature of the air by controlling a motor driving temperature changing means, said motor being controlled in response to a speed/torque control signal;

sensing a DEMAND cycle time period during which the temperature signal is in the DEMAND state;

sensing a NO DEMAND cycle time period during which the temperature signal is in the NO DEMAND state; and generating the speed/torque control signal as a function of both the DEMAND cycle time period and the NO DEMAND cycle time period whereby the speed/torque of the motor is controlled depending upon the period of time between each successive state change.

35. A method for conditioning air in a space by heating or cooling the air to change its temperature, said method comprising:

generating in response to the temperature of the air in the space a two state temperature signal having cycles including a DEMAND state and a NO DEMAND state, each said state corresponding to a difference between the temperature of the air in the space and a set point temperature;

changing the temperature of the air in response to a first control signal;

sensing a DEMAND cycle time period during which the temperature signal is in the DEMAND state;

sensing a NO DEMAND cycle time period during which the temperature signal is in the NO DEMAND state; and generating the first control signal as a function of both the DEMAND cycle time period and the NO DEMAND cycle time period;

moving the air in response to a second control signal; and generating the second control signal independent of the first control signal generating step and as a function of both the DEMAND cycle time period and the NO DEMAND cycle time period.

36. The method of claim 34 further comprising providing a memory storing time constants which are a function of the thermal mass of the structure being heated and/or cooled and generating said control signals based on said time constants.

37. The method of claim 36 further comprising providing a nonvolatile memory for storing various time constants which correspond to various parameters of various systems and selecting a time constant corresponding to the system.

38. The method of claim 34 further comprising increasing motor speed/torque of a subsequent one of the cycles when the duty cycle of the temperature signal of a previous one of the cycles is above a preset maximum and decreasing motor speed/torque of a subsequent one of the cycles when the duty cycle of the temperature signal of a previous one of the cycles is below a preset minimum.

39. The method of claim 34 further comprising providing a thermostat having contacts which close to provide the temperature signal and having an anticipator which anticipates the opening of the contacts and adjusting a power level provided to the anticipator during a subsequent one of the cycles as a function of the period of time during which the contacts of the thermostat are closed during a previous one of the cycles.

40. The method of claim 34 further comprising providing a thermostat having an anticipator and adjusting a power level provided to the anticipator during a subsequent one of the cycles as a function of the duty cycle of the temperature signal during a previous one of the cycles.

41. The method of claim 40 further comprising decreasing the power level provided to the anticipator during the subsequent cycle in response to an increase in the duty cycle of the temperature signal during the previous cycle.

42. The method of claim 40 further comprising decreasing according to a linear algorithm the power level provided to the anticipator during the subsequent cycle in response to an increase in the duty cycle of the temperature signal during the previous cycle.

43. The method of claim 34 further comprising:
storing calibrating parameters representative of operation of said motor driving a predetermined load; and
generating the control signal to control motor speed or torque in response to the calibrating parameters and in response to the temperature signal.

44. A method for conditioning air in a space by heating or cooling the air to change its temperature, said method comprising:

generating a two state temperature signal in response to the temperature of the air in the space, the temperature signal having a DEMAND state and having a NO DEMAND state;

changing the temperature of the air by controlling a motor driving temperature changing means, said motor being controlled in response to a speed/torque control signal;

sensing a DEMAND cycle time period during which the temperature signal is in the DEMAND state; and generating the speed/torque control signal as a function of the DEMAND cycle time period whereby the speed/torque control signal controls the speed/torque of the motor as a function of the DEMAND cycle time period.

45. The method of claim 44 further comprising:
providing a thermostat to generate a two state temperature signal having a first state when the air in the space is above the set point temperature and having a second state when the air in the space is below the set point temperature;
providing a compressor for cooling the air; and
driving the compressor with the motor.

46. The method of claim 45 further comprising providing a predefined operating speed range to the compressor and initially operating the motor to drive the compressor at the midpoint of the range.

47. The method of claim 45 further comprising providing a predefined operating speed range for the compressor and operating the motor to drive the compressor at a speed with the range which speed is increasing at a fixed rate during the period that the thermostat indicates the DEMAND state.

48. The method of claim 47 further comprising operating the motor to drive the compressor at a speed within the range which speed is decreasing at a rate greater than the fixed rate during the period that the thermostat indicates the NO DEMAND state.

49. The method of claim 44 further comprising:

storing calibrating parameters representative of operation of said motor driving a predetermined load; and generating the control signal to control motor speed or torque in response to the calibrating parameters and in response to the sensed period between state changes.

50. In a system providing cycles of an on/off signal, an apparatus comprising:
- a motor operating at a speed or torque defined by a motor speed/torque control signal; and
- a control responsive to the on/off signal and including means for sensing a DEMAND period of time between state changes of the on/off signal and for sensing a NO DEMAND period of time between changes of the on/off signal, said control generating the motor speed/torque control signal as a function of both the DEMAND and NO DEMAND periods between state changes whereby said motor speed/torque control signal is provided to the motor to control the torque or speed of the motor dependent upon the DEMAND and NO DEMAND periods between each successive state change.

51. The apparatus of claim 50 wherein the control includes a microprocessor and wherein during operation the microprocessor increases motor speed/torque of a subsequent one of the cycles when the duty cycle of the on/off signal of a previous one of the cycles is above a preset maximum and the microprocessor decreases motor speed/torque of a subsequent one of the cycles when the duty cycle of the on/off signal of a previous one of the cycles is below a preset minimum.

52. The apparatus of claim 50 wherein the system includes a mechanism having contacts which close to provide the cycles of the on/off signal and includes an anticipator which anticipates the opening of the contacts of subsequent cycles of the on/off signals said apparatus further comprising means for adjusting a power level provided to the anticipator during a subsequent one of the cycles as a function of the duty cycle of the on/off signal during a previous one of the cycles.

53. The apparatus of claim 52 wherein the adjusting means decreases the power level provided to the anticipator during the subsequent cycle in response to an increase in the duty cycle of the on/off signal during the previous cycle.

54. The apparatus of claim 52 wherein the adjusting means decreases according to a linear algorithm the power level provided to the anticipator during the subsequent cycle in response to an increase in the duty cycle of the on/off signal during the previous cycle.

55. The apparatus of claim 50 wherein the control comprises:

- a memory for storing calibrating parameters representative of operation of said motor driving a predetermined load;
- means, responsive to the calibrating parameters and to the on/off signal, for generating said motor control signal to control motor speed or torque.

56. The apparatus of claim 55 wherein the calibrating parameters represent operation of the motor driving no load.

57. The apparatus of claim 55 wherein the calibrating parameters include a current offset and a multiplier.

58. In a method using cycles of an on/off signal and using at least one motor in response to a motor speed/torque control signal; said method comprising:
- sensing a DEMAND period of time between state changes of the on/off signal;
- sensing a NO DEMAND period of time between state changes of the on/off signal;
- generating the motor speed/torque control signal as a function of both the DEMAND and NO DEMAND periods between state changes whereby the speed/torque of the motor depends upon the DEMAND and NO DEMAND periods between each successive state change.

59. The method of claim 58 further comprising increasing speed/torque of the motor during a subsequent one of the cycles when the duty cycle of the on/off signal of a previous one of the cycles is above a preset maximum and decreasing speed/torque of the motor during a subsequent one of the cycles when the duty cycle of the on/off signal of a previous one of the signals is below a preset minimum.

60. The method of claim 58 wherein the method uses a mechanism having contacts which close to provide the cycles of the on/off signal and wherein the method uses an anticipator which anticipates the opening of the contacts of subsequent cycles of the on/off signal, said method further comprising adjusting a power level provided to the anticipator during a subsequent one of the cycles as a function of the duty cycle of the on/off signal during a previous one of the cycles.

61. The method of claim 60 further comprising decreasing the power level provided to the anticipator during the subsequent cycle in response to an increase in the duty cycle of the on/off signal during a previous cycle.

62. The method of claim 60 further comprising decreasing according to a linear algorithm the power level provided to the anticipator during the subsequent cycle in response to an increase in the duty cycle of the on/off signal during a previous cycle.

63. The method of claim 58 further comprising:
- storing calibrating parameters representative of operation of said motor driving a predetermined load; and
- generating the motor control signal to control motor speed or torque in response to the calibrating parameters and in response to the on/off signal.

* * * * *